United States Patent [19]

McDonald et al.

[11] Patent Number: 4,603,165
[45] Date of Patent: Jul. 29, 1986

[54] MATERIAL SUITABLE FOR THERMAL PROTECTION OF ELECTROCHEMICAL CELLS AND OTHER ARTICLES

[75] Inventors: Robert C. McDonald, Stow; James M. Bennett, N. Andover; Ronald E. Barth, Chelmsford, all of Mass.

[73] Assignee: GTE Government Systems Corporation, Waltham, Mass.

[21] Appl. No.: 803,022

[22] Filed: Nov. 29, 1985

[51] Int. Cl.⁴ .............................................. C08K 3/08
[52] U.S. Cl. ................................. 524/440; 521/919; 524/567; 429/62; 429/101
[58] Field of Search ............... 524/440, 567; 521/919; 429/62, 101

[56] References Cited

U.S. PATENT DOCUMENTS

| | | | |
|---|---|---|---|
| 3,969,317 | 7/1976 | Johnson | 524/440 |
| 4,075,400 | 2/1978 | Fritts | 429/62 |
| 4,351,888 | 9/1982 | Dawpier et al. | 429/62 |

FOREIGN PATENT DOCUMENTS

| | | | |
|---|---|---|---|
| 4817535 | 5/1973 | Japan | 524/440 |
| 5159947 | 5/1976 | Japan | 524/440 |
| 5268247 | 6/1977 | Japan | 524/440 |
| 57107814 | 7/1982 | Japan | 524/440 |
| 58164621 | 9/1983 | Japan | 524/440 |
| 1410313 | 10/1975 | United Kingdom | 521/919 |
| 348582 | 8/1972 | U.S.S.R. | 524/440 |
| 0666192 | 6/1979 | U.S.S.R. | 524/440 |

OTHER PUBLICATIONS

Journal of Applied Physics, vol. 42, No. 2, Feb. 1971, Malliaris et al. pp. 614–618.
Manufacturing Technol CHMT-4,372 (1981)—Doljack pp. 313–319 [CH 1671-7/81/0000-0313]-1981 IEEE.

*Primary Examiner*—Joseph L. Schofer
*Assistant Examiner*—N. Sarofim
*Attorney, Agent, or Firm*—J. Stephen Yeo

[57] ABSTRACT

A material is provided which has a positive thermal coefficient of resistance. The material is made of nickel particles sintered in a plastic matrix. The material is suitable in internal elements of electrochemical cells.

3 Claims, 2 Drawing Figures

MATERIAL SUITABLE FOR THERMAL PROTECTION OF ELECTROCHEMICAL CELLS AND OTHER ARTICLES

BACKGROUND OF THE INVENTION

This invention relates to a composition of matter having a positive thermal coefficient of resistance and, more particularly, it is concerned with such materials suitable for electrochemical cells having internal temperature protection.

A particularly effective class of primary electrochemical cells employs liquid cathode material as a component of an electrolyte solution. Among the liquid cathode materials found useful are fluid oxyhalides, fluid non-metallic oxides, fluid non-metallic halides, and mixtures thereof. An electrolyte solute may be dissolved in the liquid cathode material in order to raise its conductivity. Specifically, the liquid cathode material may be thionyl chloride and the solute may be lithium tetrachloroaluminate. The anode of the cell is usually lithium or other highly electropositive metal. During discharge, the liquid cathode is electrochemically reduced on a cathode current collector. The cathode current collector may include a carbon layer supported on a conductive substrate.

A single cell may have one or more anodes alternately arranged with one or more cathode current collectors. Adjacent elements may be separated by porous insulating material such as glass paper. The cell is activated when the electrodes are wetted by the electrolyte solution.

Heat is generated within the cell by the exothermic electrochemical reaction and by ohmic losses during high current flow. Control of such heat is critical to safe operation. If the temperature near a lithium anode exceeds the melting point of the lithium, a rapid exothermic reaction of the lithium anode with other cell components can result. The quantity of reacting lithium needed for significant heat and cell rupture is quite small. In some cases, the source of heat can be quite localized resulting from a small metallic short between the electrodes.

One commonly used device to avoid excessive thermal excursions is a thermally activated switch which disconnects the external load to the cell in the event of excessive heat. However, this arrangement does not disconnect internal shorts.

It is known to place a temperature sensitive switch inside or in thermal contact with the cell case in order to sense excessive temperature and open the external circuit. While this arrangement has been generally used in the art, there are two disadvantages. First, the switch senses temperature at only one location and second, the conventional thermal switch cannot interrupt a short circuit created within the electrode stack where electric current passes between adjacent electrode plates.

It is an object of the invention to provide a material which is suitable for incorporation within elements of an electrochemical call and other articles for electrical disconnecting all or part of the article in response to excessive temperature.

SUMMARY OF THE INVENTION

Briefly, according to one aspect of the invention, there is provided a material having a positive thermal coefficient of resistance. The material is a sintered mixture of nickel particles in the range of 2.2 to 3.0 microns and plaster particles 20 to 60 times larger than the nickel particles. The nickel constitutes about 6 to 12 percent by volume of the mixture.

DESCRIPTION OF THE INVENTION

Figure 1:
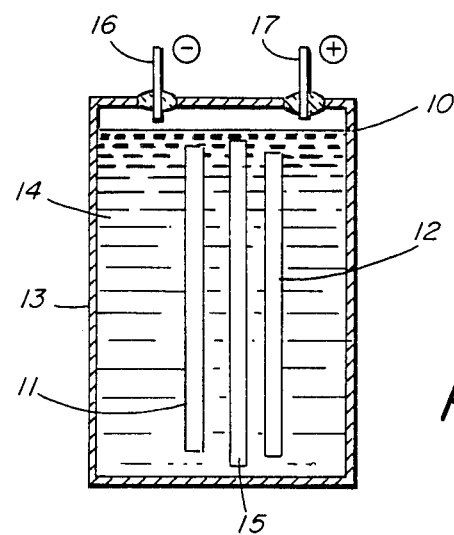
FIG. 1 is a schematic representative of an electrochemical cell in which materials embodying the invention may be used.

Referring first to FIG. 1, there is seen a schematic representation of an electrochemical cell 10. There is shown a pair of electrodes consisting of an anode 11 made of lithium metal and a cathode current collector 12 which will be described in more detail. The electrodes 11, 12 are contained within a housing 13. The cell 10 is activated when the anode 11 and cathode current collector 12 are immersed in by an electrolytic solution 14 which includes as a liquid cathode material. Adjacent electrodes are preferably separated by a porous sheet 15 made of an electrically insulating material such as glass paper.

The collection of electrodes is called a battery stack. Battery stacks are made in a number of configurations, including parallel plates, concentric cylinders, and spiral wound coils, any of which may be used in keeping with the invention. Electrical connection to the electrodes may be made directly through a conductive housing or by leads between an electrode and a terminal. Anode 11 and cathode current collector 12 are shown connected by separate connecting leads to feed-through terminals 16, 17.

Figure 2:
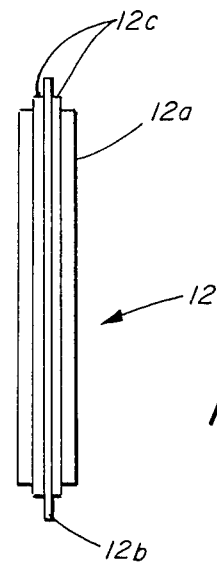
FIG. 2 is a cross-sectional view of a cathode current collector used in the cell of FIG. 1.

Turning now to FIG. 2, there is seen a cross-sectional view of the cathode current collector 12. Cathode current collector 12 includes a reduction layer 12a and a conductive substrate 12b. As a feature of the invention, a variable resistance layer 12c is interposed between the reduction layer 12a and the conductive substrate 12b.

The surface of reduction layer 12a is where the liquid cathode material is electrochemically reduced. The reduction layer is preferably made of carbon particles and a binder. The carbon particles may be carbon black and the binder may be polytetrafluoroethylene.

The variable resistance layer 12c is made of a material having a positive thermal coefficient of resistance (PTCR). At normal operating temperatures, the variable resistance layer has a resistivity substantially lower than that of the reduction layer (e.g., 9 ohms-cm vs. 170 ohms-cm). The resistivity of the variable resistance layer increases rapidly as the temperatures exceeds the normal operating temperatures of the cell.

The conductive substrate is made of a metal such as stainless steel or nickel which does not take part in the electrochemical reaction. The purposes of the conductive substrate is to provide mechanical support for the reduction layer and the variable resistance layer, as well as to provide a low resistance path for current generated by the electrochemical reaction.

All current drawn externally through a load and most current drawn internally through an interelectrode short, pass through the cathode substrate and the variable resistance layer.

During external short circuit, heat is generated in the reduction layer and the variable resistance layer from ohmic losses. At a predetermined safe temperature, the variable resistance layer undergoes a physical transition from a conductor to an insulator thereby substantially reducing the electrochemical rate capability at any site in the cell experiencing a rise in temperature. Heating at that site ceases or is moderated, so that the melting point of lithium is not exceeded.

During an internal short circuit, only areas of the variable resistance layer adjacent to the warming reduction layer loses their conductivity, so the current ceases to flow at that site. The remainder of the variable resistance layer retains its conductivity so that a normal external current drain can be maintained.

A feature of the invention is a PTCR material which is made of nickel particles suspended in a matrix of sintered plastic particles. The PTCR material may be used as a variable resistance layer. The plastic is chosen to be resistant to the electrolyte and to have a significantly larger coefficient of expansion than nickel.

As a further feature of the invention, the PTCR material may be nickel particles sintered with either ethylene tetrafluoroethylene or polypropylene particles. The ETFE/nickel composite is compatible with neutral electrolyte indefinitely; the polypropylene/nickel composite is compatible with electrolyte for hours and is suitable for many reserve cell applications where electrolyte is stored separately from the battery stack until activation.

These PTCR materials offer the added advantage that carbon can be bonded to their surfaces by sintering to improve electrical contact.

At safe operating temperatures, the nickel particles provide electronic conductivity in all directions through bridging contacts. As the plastic particles have a significantly larger coefficient of thermal expansion than nickel at a given temperature, the entire matrix expands enough to break a sufficient number of the nickel particle bridging contacts. At this point, the material loses its electronic conductivity.

The quantity and size of the nickel particles are important parameters. If the particles are too small, the bridging contacts are also too small for optimum results. If the nickel particles are too large, the PTCR material is not sensitive enough to heat. Too much nickel will make the material brittle. Too little nickel results in a high normal operating resistance, which increases ohmic losses, the resulting heat causing the cell to fail.

Preferably, the amount of the nickel particles is in the range of six to twelve percent of the volume of the plastic particles. The plastic particles are preferably 20 to 60 times larger than the nickel particles, which are preferably in the range of 2.2 to 3.0 microns.

Measurements were made of the material resistance as a function of temperature up to 251° C. 3 cm² plates which were 0.1 cm thick were placed between two pieces of stainless steel or two pieces of nickel screen and sintered to give an integral sandwich structure. Nickel tabs were welded to each side of this structure to assist measurement of the resistance.

Using Ni loadings from 6% to 12% by volume, uniform films ranging from 5 to 50 mil thick were produced. The following examples demonstrate the low resistance of these materials at normal operating temperatures, the temperatures at which the materials reached one kilo ohm and one mega ohm, and their ability to bond to nickel and stainless steel substrates.

EXAMPLE 1

A mixture of nickel particles have sizes in the range from 2.2 to 3.0 micron and ETFE particles which passed through 115 mesh screen was prepared.

A 0.75 inch diameter disc made from nickel screen with welded tab was centered in the bottom of a 1 inch diameter press fixture. Into this, a quantity of Ni/ETFE mix sufficient to produce a 55 mil thick sintered disc was poured. A second metal disc similar to the first was centered on top of the mix. The whole assembly was put under 128 psi for one-half minute and the unsintered preform removed from the fixture. The preform was placed in a 290° C. oven and sintered for 5 minutes. The oven was then turned off and allowed to cool slowly.

Leads were soldered to the tabs that had been previously welded to the metal substrates and attached to an ohm meter. A thermocouple was taped to the disc and its leads attached to a datalogger. The whole assembly was placed in an oven and temperature and resistance recorded while the temperature was allowed to rise. Table 1 indicates the results.

TABLE 1

| Ni/ETFE WITH NICKEL SCREEN SUBSTRATES | | | |
|---|---|---|---|
| Ni/ETFE RATIOS | ROOM TEMP RESISTANCE OHMS | TEMP C.° AT $10^3$ OHMS | TEMP C.° AT $10^6$ OHMS |
| 6/94 | 0.3 | 208 | 224 |
| 8/92 | 0.3 | 222 | 229 |
| 12/88 | 0.2 | 241 | 251 |

EXAMPLE 2

The procedure of Example 1 was repeated with stainless steel replacing the nickel screen.

A 0.75 inch diameter×2 mil thick stainless steel disc with tabs welded to it were used.

To achieve a tight, uniform bond to the stainless steel, a pretreatment was performed. A very light coating (about 1 mil) of the same Ni/ETFE mix to be sintered was applied to the stainless steel, and the resulting subassembly sintered at 290° for five minutes. The rest of the procedure was identical to that of Example 1. Table 2 indicates the results.

TABLE 2

| Ni/ETFE WITH STAINLESS STEEL DISC SUBSTRATES | | | |
|---|---|---|---|
| Ni/ETFE RATIOS | ROOM TEMP RESISTANCE OHMS | TEMP C.° AT $10^3$ OHMS | TEMP C.° AT $10^6$ OHMS |
| 6/94 | 0.3 | 212 | 214 |
| 8/92 | 0.3 | 209 | 222 |

Ni loading of polypropylene may be used to achieve switching temperatures considerably lower than the Ni loaded ETFE mixtures. The following example demonstrates one of these materials' low resistance at normal operating temperature, the temperature at which the material reached one kilo ohm and one mega ohm and its ability to bond to nickel.

EXAMPLE 3

A mixture of 35 micron polypropylene powder and nickel powder ranging from 2.2 to 3.0 microns was prepared.

Metal substrate: 0.75 inch diameter annealed nickel screens welded to tabs were used as the substrate.

The procedure was identical to those of examples 1 and 2 except that Ni/polypropylene mixes were used instead of Ni/ETFE mixes and the oven temperature used was 170° C. Test results are shown in Table 3.

TABLE 3

Ni/POLYPROPYLENE WITH NICKEL SUBSTRATE

| Ni/POLYPROPY-LENE RATIO | ROOM TEMP RESISTANCE OHMS | TEMP C.° AT $10^3$ OHMS | TEMP C.° AT $10^6$ OHMS |
| --- | --- | --- | --- |
| 12/88 | 1.8 | 83 | 107 |

These materials and their equivalents may be incorporated with elements of electrochemical cells for electrically disconnecting all or part of the cell in response to excessive temperatures.

The foregoing materials include the best mode contemplated by the inventors. It will be apparent to those skilled in the art that variations can be made on our invention. Therefore, the scope of the invention is to be defined by the claims and not to specifics of the description or examples.

We claim:

1. A positive thermal coefficient of resistance material consisting of a sintered mixture of nickel particles having sizes in the range of 2.2 to 3.0 microns and plastic particles having sizes in the range of 20 to 60 times the size of the nickel particles with the ratio of nickel particles to plastic in the range of 6 to 12 percent by volume.

2. The positive thermal coefficient of resistance material of claim 1 consisting substantially of a sintered mixture of nickel particles having sizes in the range of 2.2 to 3.0 microns polypropylene particles having sizes in the range of 20 to 30 times the size of the nickel particles with the ratio of nickel particles to polypropylene in the range of 6 to 12 percent by volume.

3. The positive thermal coefficient of resistance material of claim 1 consisting substantially a sintered mixture of nickel particles having sizes in the range of 2.2 to 3.0 microns and ethylene tetrafluoroethylene particles having sizes in the range of 20 to 60 times the size of the nickel particles, with the ratio of nickel particles to ethylene tetrafluoroethylene in the range of 6 to 12 percent by volume.

* * * * *